(12) United States Patent
Li et al.

(10) Patent No.: US 12,525,007 B2
(45) Date of Patent: Jan. 13, 2026

(54) TRAINING METHOD AND ELECTRONIC DEVICE

(71) Applicants: HON HAI PRECISION INDUSTRY CO., LTD., New Taipei (TW); Foxconn Technology Group Co., Ltd., Guangdong Province (CN)

(72) Inventors: Yung-Hui Li, New Taipei (TW); Hong-Yu Li, New Taipei (TW)

(73) Assignees: HON HAI PRECISION INDUSTRY CO., LTD., New Taipei (TW); Foxconn Technology Group Co., Ltd., Guangdong Province (CN)

( * ) Notice: Subject to any disclaimer, the term of this patent is extended or adjusted under 35 U.S.C. 154(b) by 319 days.

(21) Appl. No.: 18/327,885

(22) Filed: Jun. 1, 2023

(65) Prior Publication Data
US 2023/0394811 A1 Dec. 7, 2023

Related U.S. Application Data

(60) Provisional application No. 63/365,707, filed on Jun. 2, 2022.

(51) Int. Cl.
G06V 10/82 (2022.01)
G06T 3/4053 (2024.01)

(52) U.S. Cl.
CPC .......... *G06V 10/82* (2022.01); *G06T 3/4053* (2013.01)

(58) Field of Classification Search
None
See application file for complete search history.

(56) References Cited

U.S. PATENT DOCUMENTS

| 12,106,399 B2 * | 10/2024 | Cucchiara | G06N 3/045 |
| 12,354,202 B1 * | 7/2025 | Gupta | G10L 21/0272 |
| 2020/0408864 A1 * | 12/2020 | Mailhe | G06N 3/088 |

(Continued)

FOREIGN PATENT DOCUMENTS

| CN | 113129231 A | * | 7/2021 | G06N 3/045 |
| CN | 115034964 A | * | 9/2022 | G06N 3/08 |
| CN | 115345776 A | * | 11/2022 | G06T 3/4053 |

OTHER PUBLICATIONS

Tero Karras and Timo Aila and Samuli Laine and Jaakko Lehtinen, Progressive Growing of GANs for Improved Quality, Stability, and Variation, 2018, https://arxiv.org/abs/1710.10196 (Year: 2018).*

(Continued)

*Primary Examiner* — Gandhi Thirugnanam
(74) *Attorney, Agent, or Firm* — CKC & Partners Co., LLC

(57) ABSTRACT

A training method includes following steps. A converted image group is generated by a first generator included in the first stage generative adversarial network (GAN) according to a first input image group. A reconstructed image group is generated by a second generator included in the first stage GAN according to the converted image group. The first stage GAN is updated according the reconstructed image group and the first input image group. A sampling block is added into a first stage trained GAN to form a second stage GAN. Progressively training and growing the second stage GAN network at multiple stages according to a second input image group to a last input image group to generate a last stage trained GAN.

20 Claims, 16 Drawing Sheets

(56) References Cited

U.S. PATENT DOCUMENTS

2023/0394811 A1* 12/2023 Li .................... G06V 10/82

OTHER PUBLICATIONS

Kim, Junho et al. "U-GAT-IT: Unsupervised Generative Attentional Networks with Adaptive Layer-Instance Normalization for Image-to-Image Translation." ArXiv abs/1907.10830 (2019) (Year: 2019).*
Lee H-Y, Li Y-H, Lee T-H, Aslam MS. Progressively Unsupervised Generative Attentional Networks with Adaptive Layer-Instance Normalization for Image-to-Image Translation. Sensors. 2023; 23(15):6858. https://doi.org/10.3390/s23156858 (Year: 2023).*

* cited by examiner

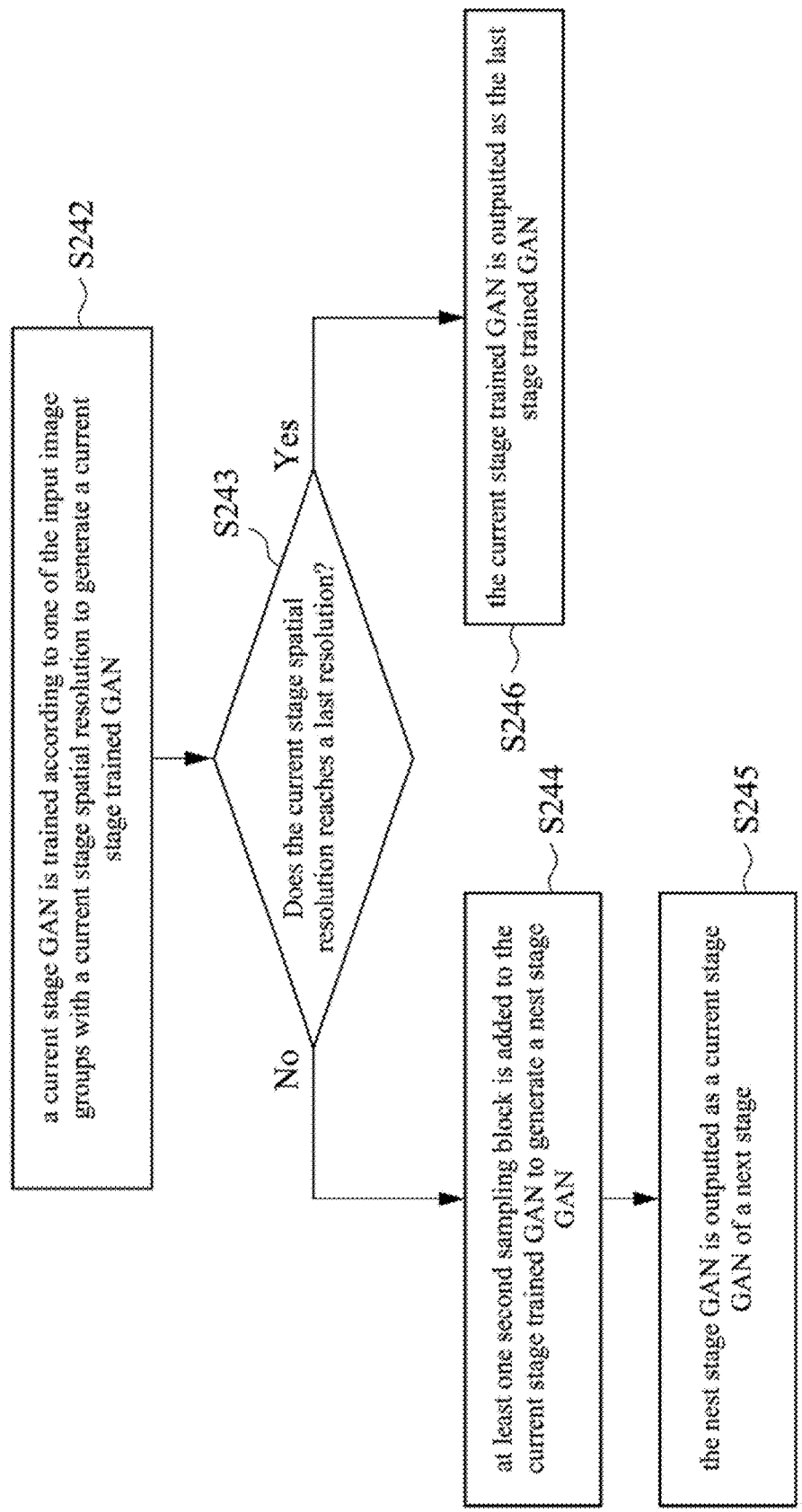

| Blocks | Input Shape | Blocks | Input Shape |
|---|---|---|---|
| 24, 44 | 512×512×16 | FRGBa1, FRGBb1 | 64×64×3 |
| 23, 43 | 256×256×32 | TRGBa1, TRGBb1 | 64×64×128 |
| 22, 42 | 128×128×64 | FRGBa2, FRGBb2 | 128×128×3 |
| 21, 41 | 64×64×128 | TRGBa2, TRGBb2 | 128×128×64 |
| BOTTa, BOTTb | 64×64×256 | FRGBa3, FRGBb3 | 256×256×3 |
| 25, 45 | 64×64×128 | TRGBa3, TRGBb3 | 256×256×32 |
| 26, 46 | 128×128×64 | FRGBa4, FRGBb4 | 512×512×3 |
| 27, 47 | 256×256×32 | TRGBa4, TRGBb4 | 512×512×16 |
| 28, 48 | 512×512×16 | | |

Fig. 5

TRAINING METHOD AND ELECTRONIC DEVICE

RELATED APPLICATIONS

This application claims the priority benefit of U.S. Provisional Application Ser. No. 63/365,707, filed Jun. 2, 2022, which is herein incorporated by reference.

BACKGROUND

Field of Invention

The disclosure relates to a training method. More particularly, the disclosure relates to a training method and an electronic device capable of training generative adversarial networks.

Description of Related Art

In generative adversarial network techniques, the application of image-style transfer has been increasingly wide and deep in recent years. However, there are some problems in the previous generative adversarial network, such as, vanishing gradient and mode collapse. Therefore, how to provide a training method and structure to solve the above problems is an important issue in this field.

SUMMARY

An embodiment of the disclosure provides a training method. The training method comprises following steps. A plurality of input image groups are generated according to a plurality of spatial resolution. The input image groups comprises a first input image group to a last input image group according to the spatial resolution from low to high. A first stage generative adversarial network (GAN) is constructed, and the first stage GAN comprises a first generator and a second generator. Training and growing the first stage GAN according to the first input image group to form a second stage GAN. The step of training and growing the first stage GAN comprises the following steps. A converted image group is generated, by the first generator, according to the first input image group. A reconstructed image group is generated, by the second generator, according to the converted image group. A cycle consistency loss function is calculated according to the reconstructed image group and the first input image group. The first stage GAN is updated based on the cycle consistency loss function to generate a first stage trained GAN. At least one first sampling block is added to the first stage trained GAN to generate a second stage GAN. Progressively training and growing the second stage GAN in a plurality of stages according to a second input image group to the last input image group to generate a last stage trained GAN.

An embodiment of the disclosure provides an electronic device. The electronic device comprises a memory device and a processor. The memory device is configured to store instructions and data. The processor is electrically coupled to the memory device, configured to access the instructions and data stored in the memory device to execute the following steps. A plurality of input image groups are generated according to a plurality of spatial resolution. The input image groups comprises a first input image group to a last input image group according to the spatial resolution from low to high. A first stage GAN is constructed, and the first stage GAN comprises a first generator and a second generator. Training and growing the first stage GAN according to the first input image group to form a second stage GAN. The step of training and growing the first stage GAN comprises the following steps. A converted image group is generated, by the first generator, according to the first input image group. A reconstructed image group is generated, by the second generator, according to the converted image group. A cycle consistency loss function is calculated according to the reconstructed image group and the first input image group. The first stage GAN is updated based on the cycle consistency loss function to generate a first stage trained GAN. At least one first sampling block is added to the first stage trained GAN to generate a second stage GAN. Progressively training and growing the second stage GAN in a plurality of stages according to a second input image group to the last input image group to generate a last stage trained GAN.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIGS. 2A-2C are flowing charts illustrating a training method and sub steps therein according to some embodiments of this disclosure.

FIG. 5 is schematic diagram illustrating shapes of input of down sampling blocks, up sampling blocks, convolutional blocks and bottleneck blocks according to some embodiments of this disclosure.

DETAILED DESCRIPTION

Figure 1:
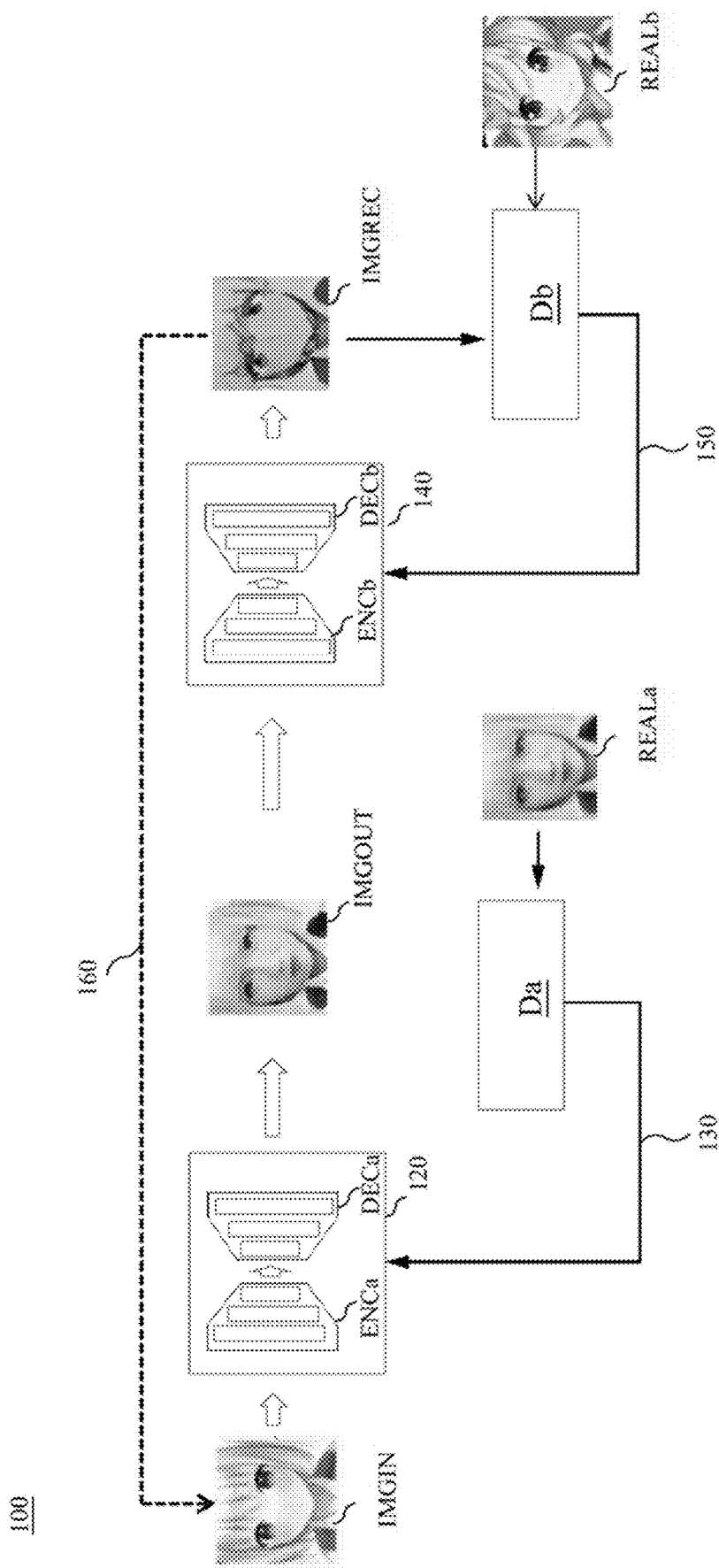
FIG. 1 is a schematic diagram illustrating a generative adversarial network (GAN) according to some embodiments of this disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a schematic diagram illustrating a generative adversarial network (GAN) 100 according to some embodiments of this disclosure. As shown in FIG. 1, the GAN 100 includes a first generator 120, a first discriminator Da, a first loss function 130, a second generator 140, a second discriminator Db, a second loss function 150 and a cycle consistency loss function 160. In some embodiments, the GAN 100 is implemented by a cycle generative adversarial network. The first generator 120 of the GAN 100 is configured to converts an input image group IMGIN with a first style to a converted image group IMGOUT with a second style.

In some embodiments, the first discriminator Da is trained based on cross entropy. Specifically, the cross entropy between the distributions of the real image group REALa and the converted image group IMGOUT can be calculated to update parameters of the first discriminator Da.

The first discriminator Da is configured to generate determination results according to the converted image group IMGOUT and the real image group REALa with the second style as well. In some embodiments, the number of the determination results can be determined by a spatial resolution of the feature map outputted by the first discriminator Da, and each pixel included in the feature map can be considered as one determination result, in order to update the weights of the generator in more detail. For example, the first discriminator Da outputs the feature map with the spatial resolution of 64*64 pixels which can be considered as 64*64 determination results. The first discriminator Da determines each images included in the converted image group IMGOUT and the real image group REALa is real or fake, in order to generate the determination results. In some embodiments, the determination results are generated by determining the truth of the converted image group IMGOUT, which can be real probability or real value. The first loss function 130 is calculated according to the determination results generated by the first discriminator Da, and the first loss function 130 is used to update the first generator 120. In some embodiment, the first loss function 130 can be implemented by an adversarial loss function.

Therefore, in original input data, the input image group IMGIN with the first style and the real image group REALa with the second style are established to train the first discriminator Da and the first generator 120, and there is no need to mark specific label on real image group REALa.

In the embodiments of FIG. 1, the first style is anime character style, and the second style is natural-face style. In other embodiments, if the first style is natural-face style, and the second style is anime character style. In other embodiments of the present disclosure, the GAN 100 can convert an actual scene to an Illustrator style image or convert a street view in video game to an actual street image. In some embodiments, the style of images generated/converted by the GAN 100 can be decided by a type of the training images. Therefore, it is not intend to limit the style transferred by the GAN 100 of the present disclosure.

The second generator 140 of the GAN 100 is configured to convert the converted image group IMGOUT with the second style to the reconstructed image group IMGREC with the first style. In some embodiments, the cycle consistency loss function 160 is calculated according to comparison results between the reconstructed image group IMGREC generated by the second generator 140 and the input image group IMGIN, in order to update the parameters of the first generator 120 and the second generator 140 based on the cycle consistency loss function 160.

In some embodiments, the second discriminator Db is trained based on cross entropy. Specifically, the cross entropy between the distributions of the real image group REALb and the reconstructed image group IMGREC can be calculated to update parameters of the second discriminator Db.

The second discriminator Db is configured to generate determination results according to the reconstructed image group IMGREC and the real image group REALb with the first style as well. The second discriminator Db determines each images included in the reconstructed image group IMGREC and the real image group REALb is real or fake, in order to generate the determination results. In some embodiments, the determination results are generated by determining the truth of the reconstructed image group IMGREC, which can be real probability or real value. The second loss function 150 is calculated according to the determination results generated by the second discriminator Db, and the second loss function 150 is used to update the second generator 140.

After staged training on the second discriminator Db, the second loss function 150 update the parameters of the second generator 140 according to the determination results generated by the second discriminator Db. In some embodiments, the second loss function 150 can be implemented by an adversarial loss function.

To be noted that, the GAN 100 utilizes comparison results between the reconstructed image group IMGREC generated by the second generator 140 and the input image group IMGIN to calculate the cycle consistency loss function 160, so as to update parameters of the first generator 120. As a result, the second generator 140 and the cycle consistency loss function 160 included in the GAN 100 can improve the insufficient diversity of generated results which is caused by a single pair of discriminator and generator are to satisfy a result of a certain distribution to be true and result in mode collapse.

Figure 2A:
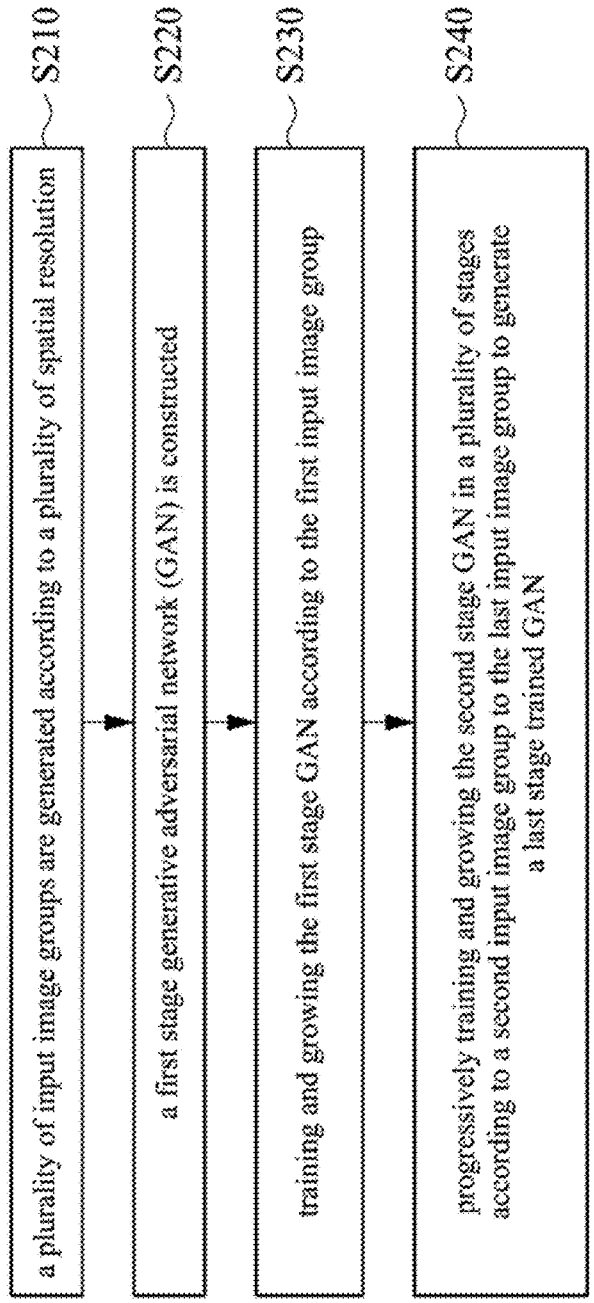
Figure 2B:
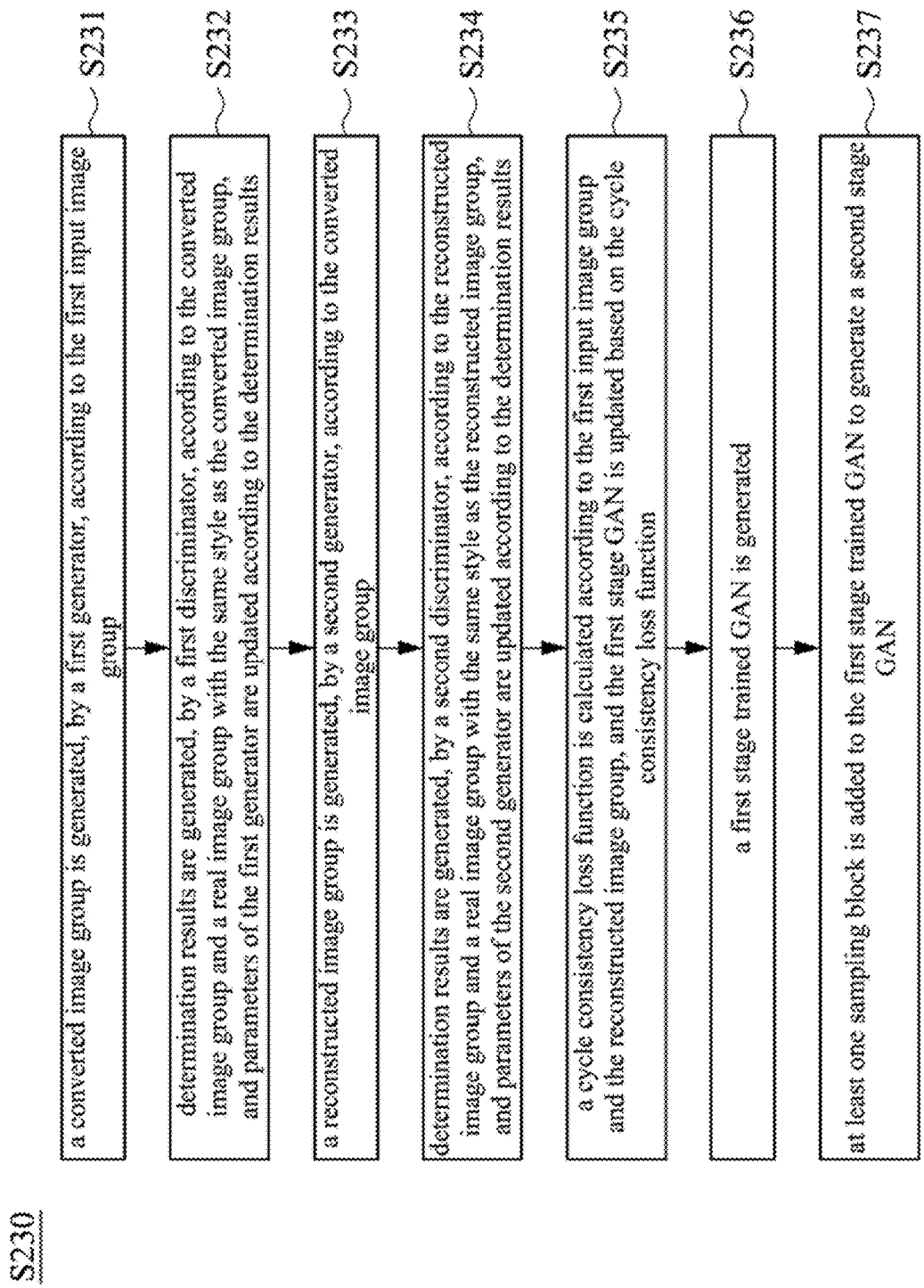
Figure 3A:
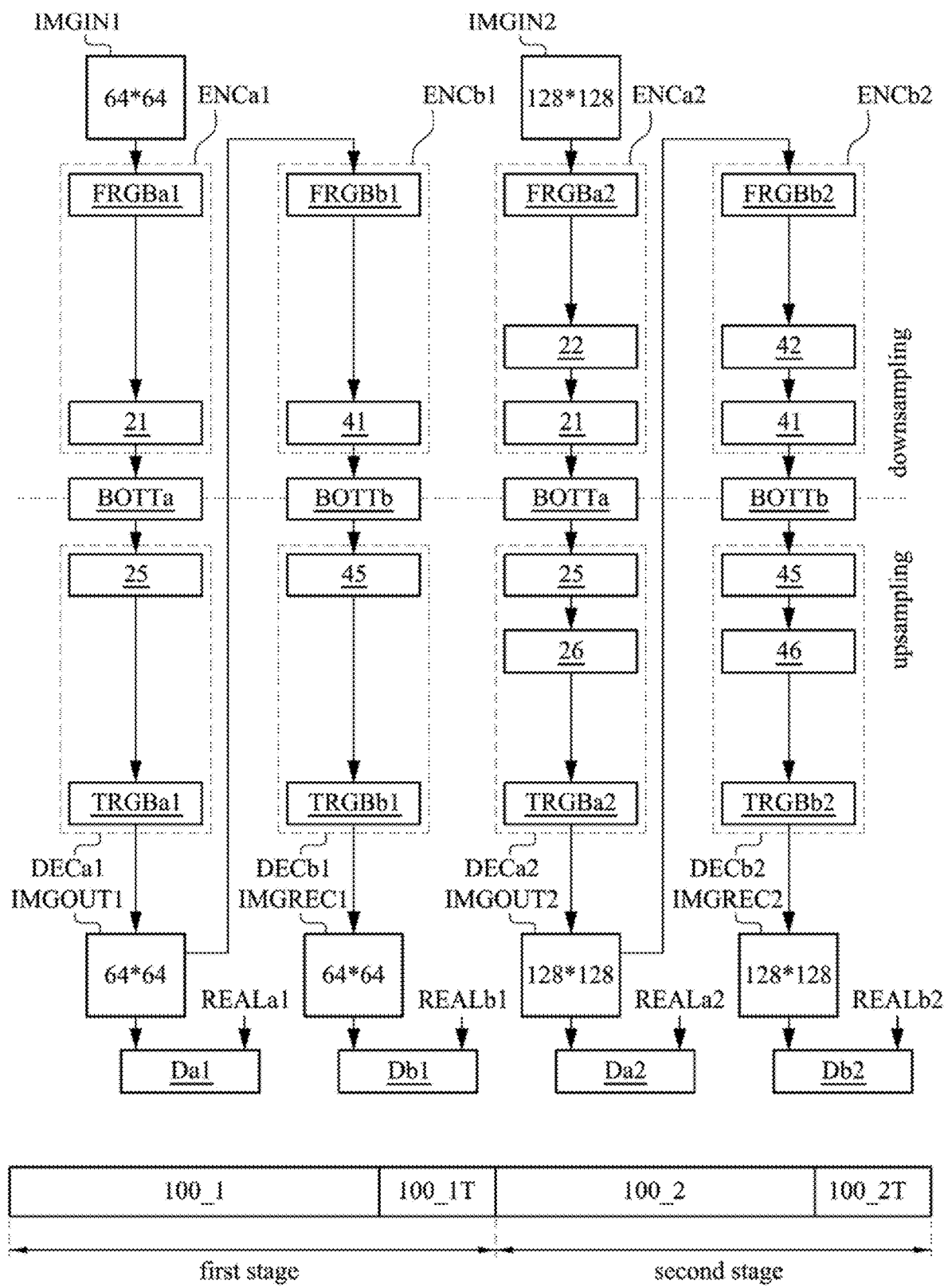
FIGS. 3A-3B are schematic diagram illustrating a first stage GAN to a last stage trained GAN according to some embodiments of this disclosure.
Figure 3B:
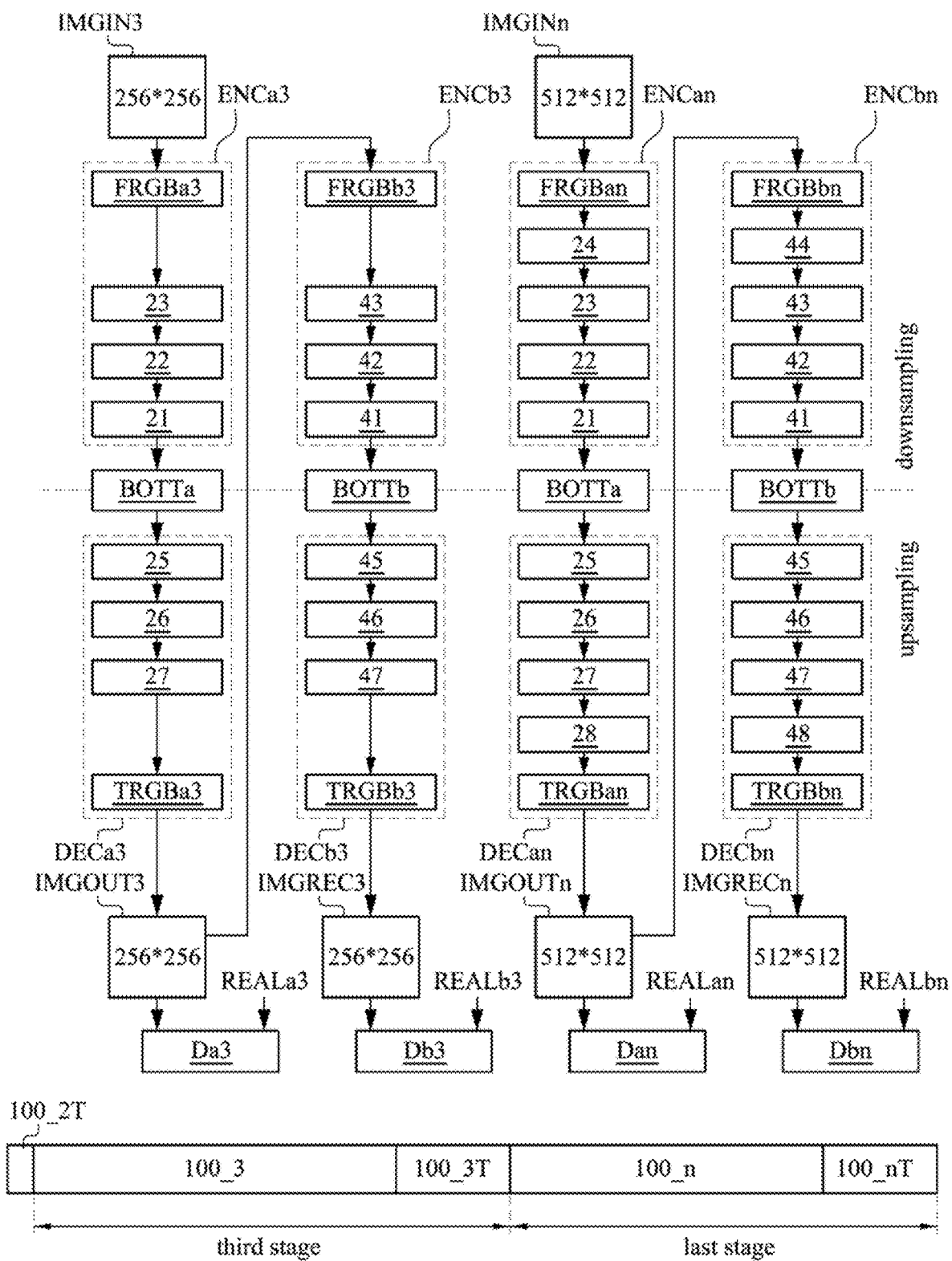
Figure 4B:
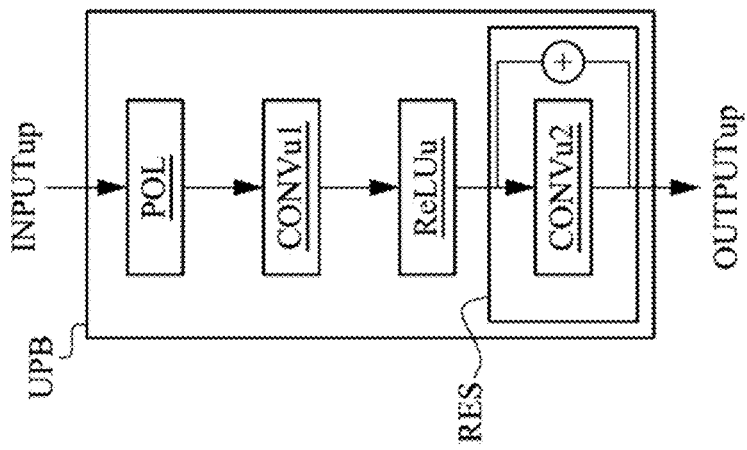
FIGS. 4A-4B are schematic diagram illustrating a down sampling block and a up sampling block according to some embodiments of this disclosure.
Figure 4A:
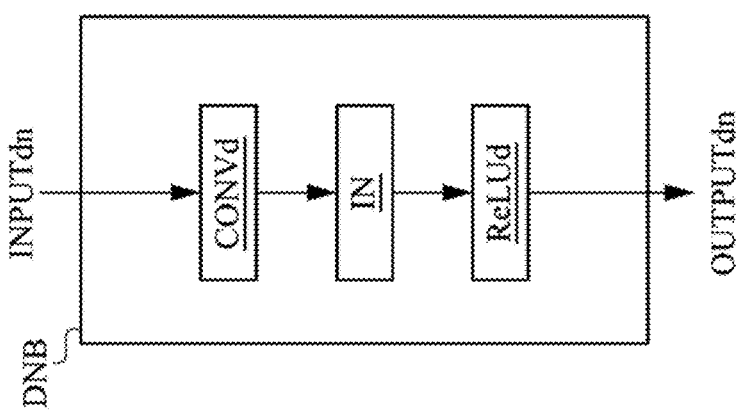

Reference is made to FIGS. 1, 2A-2C, 3A-3B, 4A-4B and 5. FIGS. 2A-2C are flowing charts illustrating a training method 200 and sub steps S230 and S240 therein according to some embodiments of this disclosure. FIGS. 3A-3B are schematic diagram illustrating a first stage GAN 100_1 to a last stage trained GAN 100_nT according to some embodiments of this disclosure. FIGS. 4A-4B are schematic diagram illustrating a down sampling block DNB and a up sampling block UPB according to some embodiments of this disclosure. FIG. 5 is schematic diagram illustrating shapes of input of down sampling blocks 21-24 and 41-44, up sampling blocks 2528 and 4548, convolutional blocks FRGBa1~FRGb4, TRGBa1~TRGa4, FRGBb1~FRGb4 and TRGBb1~TRGb4 and bottleneck blocks BOTTa and BOTTb according to some embodiments of this disclosure. The training method 200 includes step S210-S240.

In step S210, a plurality of input image groups are generated according to a plurality of spatial resolution. In some embodiments, a resolution or image size of a group of original training images can be reduced and/or be increased to generate the first input image group IMGIN1 to the fourth input image group IMGIN4 according to spatial resolutions from low to high. As shown in FIGS. 3A and 3B, the spatial resolutions of the first image group IMGIN1 to the fourth input image group IMGIN4 are 64*64, 128*128, 256*256 and 512*512 pixels, respectively. In some embodiments, if the target resolution (or last resolution) is set at 512*512 pixels, and the resolution of the last input image group IMGIN4 is 512*512 pixels. In other embodiments, the GAN 100 can be progressively trained by more or less groups of images according to the appropriate last resolution (such as, 256, 1024, 4096 pixels or other resolutions). Therefore, it is not intent to limit the present disclosure.

In step S220, a first stage generative adversarial network (GAN) GAN 100_1 is constructed. In some embodiments, the first stage GAN 100_1 is a portion structure of the GAN 100 in the first stage. In some embodiments, the two encoders ENCa~ENCb and the two decoders DECa~DECb included in the first generator 120 and the second generator 140 of the GAN 100 in the first stage can be considered as the two encoders ENCa1~ENCb1 and the two decoders DECa~DECb of the first stage GAN 100_1, and the first discriminator Da and the second discriminator Db of the GAN 100 in the first stage can be considered as the first discriminator Da1 and the second discriminator Db1 of the first stage GAN 100_1.

To be noted that, the first generator, the second generator, the first loss function, the second loss function and the cycle consistency loss function of the first stage GAN 100_1 are not illustrated in FIG. 3A. For better understanding, the first stage GAN 100_1 will be described in detailed with the symbol of the first generator 120, the second generator 140, the first loss function 130, the second loss function 150 and the cycle consistency loss function 160 of the GAN 100 in the following embodiments.

In some embodiments, the encoder ENCa1 and the decoder DECa1 in FIG. 3A correspond to the encoder ENCa and the decoder DECa of the first generator 120 of GAN 100 in the first stage. In some embodiments, the encoder ENCb1 and the decoder DECb1 in FIG. 3A correspond to the encoder ENCb and the decoder DECb of the GAN 100 in the first stage.

The encoder ENCa1 includes the convolutional block FRGBa1 and the down sampling block 21. The decoder DECa1 includes the up sampling block 25 and the convolutional block TRGBa1. The encoder ENCa1 and the decoder DECa1 are connected through a bottleneck block BOTTa. The convolutional block FRGBa1, the down sampling block 21, the bottleneck block BOTTa, the up sampling block 25 and the convolutional block TRGBa1 are operating on a spatial resolution of 64*64.

Step S230 is executed for training and growing the first stage GAN according to the first input image group. The step S230 for training and growing of the first stage GAN 100_1 includes steps S231-S237.

In step S231, a converted image group is generated, by a first generator, according to the first input image group. In some embodiments, the spatial resolution of the input image group IMGIN1 is reduced and/or the features are extracted through the convolutional block FRGBa1 and the down sampling block 21 to perform down sampling, and the bottleneck block BOTTa is connected between the down sampling block 21 and the up sampling block 25 to adjust the dimension of the output of the down sampling block 21. The up sampling block 25 and the convolutional block TRGBa1 increase the spatial resolution and/or extract the features of the output of the bottleneck block BOTTa to perform up sampling and generate the converted image group IMGOUT1.

In step S232, determination results are generated, by a first discriminator, according to the converted image group and a real image group with the same style as the converted image group, and parameters of the first generator are updated according to the determination results. The first discriminator Da1 determines each of the images included in the converted image group IMGOUT1 and the real image group REALa1 is real or fake to generate the determination results. And, the first loss function 130 is calculated according to the determination results, in order to update the parameters of the first generator 120 based on the first loss function 130.

In step S233, a reconstructed image group is generated, by a second generator, according to the converted image group. In some embodiments, the spatial resolution of the converted image group IMGOUT1 is reduced and/or the features are extracted through the convolutional block FRGBb1 and the down sampling block 41 to perform down sampling, and the bottleneck block BOTTb is connected between the down sampling block 41 and the up sampling block 45 to adjust the dimension of the output of the down sampling block 41. The up sampling block 45 and the convolutional block TRGBb1 increase the spatial resolution and/or extract the features of the output of the bottleneck block BOTTb to perform up sampling and generate the reconstructed image group IMGREC1.

In step S234, determination results are generated, by a second discriminator, according to the reconstructed image group and a real image group with the same style as the reconstructed image group, and parameters of the second generator are updated according to the determination results. The second discriminator Db1 determines each of the images included in the converted image group IMGOUT1 and the real image group REALa1 is real or fake to generate the determination results. And the second loss function 150 is calculated according to the determination results, in order to update the parameters of the second generator 140 based on the determination results generated by the second discriminator Db1.

In step, S235, a loss cycle function is calculated according to the first input image group and the reconstructed image group, and the first stage GAN is updated based on the loss cycle function. Since the reconstructed image group IMGREC1 and the first input image group IMGIN1 have the same style, the cycle consistency loss function 160 calculated thereby can avoid the mode collapse.

In step S236, a first stage trained GAN is generated. Based on the training steps S231-S235 for the first stage GAN 100_1, the first stage trained GAN 100_1T is generated.

In step S237, at least one sampling block is added to the first stage trained GAN to generate a second stage GAN. As shown in FIG. 3A, on the basics of the first stage trained GAN 100_1T, the down sampling block 22 and the up sampling block 26 are respectively added to the encoder ENCa1 and the decoder DECa1, and the convolutional blocks FRGBa1 and TRGBa1 included in the encoder ENCa1 and the decoder DECa1 respectively correspond to the convolutional blocks FRGBa2 and TRGBa2, so as to form the encoder ENCa2 and the decoder DECa2 of the second stage GAN 100_2, as shown in FIG. 3A.

As shown in FIG. 5, in some embodiments, the down sampling block 22 and the up sampling block 26 operate on a higher spatial resolution, and the down sampling block 21 and the up sampling block 25 operate on a lower spatial resolution. In some embodiments, the down sampling block 21 and the up sampling block 25 operate on a spatial resolution of 64*64 pixels, and the down sampling block 22 and the up sampling block 26 operate on a spatial resolution of 128*128 pixels. The convolutional blocks FRGBa2 and TRGBa2 operate on a higher spatial resolution, and the convolutional blocks FRGBa1 and TRGBa1 operate on a lower spatial resolution. In some embodiments, the convolutional blocks FRGBa1 and TRGBa1 operate on a spatial resolution of 64*64 pixels, and the convolutional blocks TRGBa2 and TRGBa2 operate on a spatial resolution of 128*128 pixels.

Similarity, on the basics of the first stage trained GAN 100_1T, the down sampling block 42 and the up sampling block 46 are respectively added to the encoder ENCb1 and the decoder DECb1, and the convolutional blocks FRGBb1 and TRGBb1 respectively correspond to the convolutional blocks FRGBb2 and TRGBb2, so as to form the encoder ENCb2 and the decoder DECb2 of the second stage GAN 100_2, as shown in FIG. 3A. In some embodiments, the down sampling block 42 and the up sampling block 46 operate on a higher resolution, the down sampling block 41 and the up sampling block 45 operate on a lower resolution. In some embodiments, the down sampling block 41 and the up sampling block 45 operate at a spatial resolution of 64*64 pixels, and the down sampling block 42 and the up sampling block 46 operate at a spatial resolution of 128*128 pixels, as shown in FIG. 5.

In some embodiments, the down sampling block added in the current stage operate at a spatial resolution which is four times than a spatial resolution of the previous stage. In other words, the down sampling blocks can be added to the GAN 100 by progressively adding and training, and the weights of the previous stage module and the new added blocks can be correspondingly adjusted, so as to train the module in a stable manner, in order to increase the accuracy and reduce the module training time.

In some embodiments, the convolutional blocks FRGBb2 and TRGBb2 operate at a higher spatial resolution, and the convolutional blocks FRGBb1 and TRGBb1 at a lower spatial resolution. In some embodiments, the convolutional blocks FRGBb1 and TRGBb1 operate at a spatial resolution of 64*64, and the convolutional blocks FRGBb2 and TRGBb2 operate at a spatial resolution of 128*128, as shown in FIG. 5.

In some embodiments, the sampling blocks are progressively added to the first discriminator Da1~Dan and the second discriminator Db1~Dbn in different stages. In some embodiments, the spatial resolutions of the real image groups REALa1~REALan and REALb1~REALbn respectively correspond to the spatial resolutions of the converted image group IMGOUT1~IMGOUTn.

In step S240, progressively training and growing the second stage GAN in a plurality of stages according to a second input image group to the last input image group to generate a last stage trained GAN. The step S240 includes step S242-S246. In some embodiments, the encoder ENCa and the decoder DECa included in the first generator 120 of the GAN 100 in the second stage to the last stage can be respectively considered as the encoders ENCa2~ENCan2 and the decoders DECa2~DECan2 in FIGS. 3A and 3B.

And, the encoder ENCb and the decoder DECb included in the second generator 140 of the GAN 100 can be respectively considered as ENCb2~ENCbn2 and the decoders DECb2~DECbn2 in FIGS. 3A and 3B.

To be noted that, the first generator, the second generator, the first loss function, the second loss function and the cycle consistency loss function of each of the second stage GAN 100_2 to the last stage GAN 100_n are not illustrated in FIGS. 3A and 3B. For better understanding, the second stage GAN 100_2 and the last stage GAN 100_n will be described in detailed with the symbol of the first generator 120, the second generator 140, the first loss function 130, the second loss function 150 and the cycle consistency loss function 160 of the GAN 100 in the following embodiments.

In step S242, a current stage GAN is trained according to one of the input image groups with a current stage spatial resolution to generate a current stage trained GAN. For example, the input image group IMGIN2 with the spatial resolution of 128*128 are used for training the second stage GAN 100_2 to generate a second stage trained GAN 100_2T.

In step S243, Does the current stage spatial resolution reaches a last resolution? If the current stage spatial resolution of the converted image group outputted by the current stage trained GAN does not reach the last resolution, step S244 is then executed. For example, the last resolution is assumed to be 512*512 pixels, the spatial resolution of the converted image group IMGOUT2 outputted by the current stage trained GAN 100_2T is 128*128 pixels, which does not reach the last resolution (512*512 pixels), and the step S244 is then executed.

In step S244, at least one second sampling block is added to the current stage trained GAN to generate a nest stage GAN. For example, the down sampling blocks 23, 43 and the up sampling blocks 27, 47 are generated according to the spatial resolution of the input image group IMGIN3. And, the down sampling blocks 23, 43 and the up sampling block 27, 47 are added to the second stage trained GAN 100_2T to form the third stage GAN 100_3.

In the embodiments of FIGS. 3A and 3B, the down sampling block 23 and the up sampling block 27 are symmetrically added to the encoder ENCa2 and the decoder DECa2 of the first generator 120 to form the encoder ENCa3 and the decoder DECa3 of the third stage GAN 100_3. Therefore, the converted image group IMGOUT3 generated by the third stage GAN 100_3 and the input image group IMGIN3 have the same spatial resolution.

Similarity, the down sampling block 43 and the up sampling block 47 are symmetrically added to the encoder ENCa2 and the decoder DECa2 of the first generator 120 to form the encoder ENCb3 and the decoder DECb3 of the third stage GAN 100_3. Therefore, the reconstructed image group IMGREC3 generated by the third stage GAN 100_3 and the converted image group IMGOUT3 have the same spatial resolution.

In step S245, the nest stage GAN is outputted as a current stage GAN of a next stage. For example, the third stage GAN 100_3 is outputted as the current GAN of third stage, and then the steps S241-S245 are repeated.

If the spatial resolution of the converted image group outputted by the current sage trained GAN reaches the last resolution, the step S246 is then executed. For example, if the spatial resolution of the converted image group IMG-OUTn generated by the last stage trained GAN 100_nT reaches the last resolution (such as, 512*512 pixels), the training on the GAN 100 is completed.

Therefore, the GAN 100 with cycle consistency loss function 160 can avoid mode collapse in the previous GAN. Further, progressively growing the GAN 100 with cycle consistency loss function 160 can extract the global features by low resolution blocks, and then learn the local features by progressively adding the middle resolution to the high resolution blocks, so as to increase the accuracy of the output image.

In some embodiments, the architecture of the down sampling blocks 21-24 and 41-44 can be implemented by the down sampling block DNB. In some embodiments, the down sampling block DNB includes a convolutional layer CONVd, a normalization layer IN and a rectified linear unit ReLUd. The input features INPUTdn is inputted to the convolutional layer CONVd. The output of the convolutional layer CONVd is inputted into the normalization layer IN. The output of the normalization layer is inputted to the rectified linear unit ReLUd. And the rectified linear unit ReLUd outputs the output features OUTPUTdn.

In some embodiments, the architecture of the up samplings block 2528 and 4548 can be implemented by the up sampling block UPB of FIG. 4B. In some embodiments, the up sampling block UPB includes an interpolating layer POL, a convolutional layer CONVu1, a rectified linear unit ReLUu and a residual block RES. The residual block RES includes a convolutional layer CONVu2. In some embodiments, is between input and output of the convolutional layer CONVu2 to perform residual connection, and then the residual block RES outputs the output features OUTPUTup. The residual block RES included in the up sampling block UPB can improve the vanishing gradient.

Figure 6:
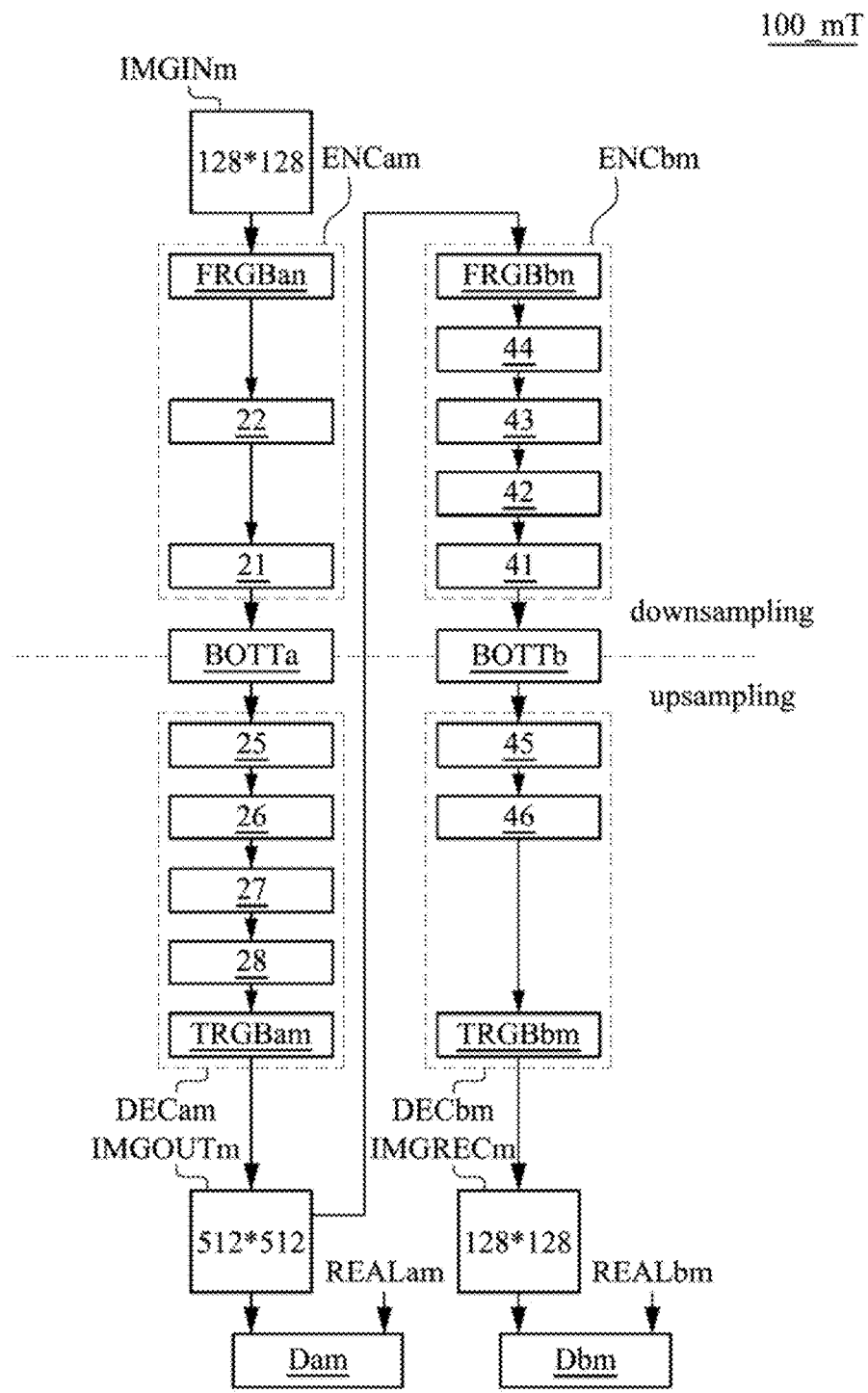
FIG. 6 is schematic diagram illustrating a last stage trained GAN according to some embodiments of this disclosure.

Reference is made to FIG. 6. FIG. 6 is schematic diagram illustrating a last stage trained GAN 100_mT according to some embodiments of this disclosure. In structure, compare the last stage trained GAN 100_mT in FIG. 6 to the last stage trained GAN 100_nT in FIG. 3, the difference is that, there is no down sampling blocks 23, 24 and up sampling block 47, 48 in last stage trained GAN 100_mT of FIG. 6, and the convolutional blocks FRGBa4 and TRGBb4 correspond to the convolutional blocks FRGBa2 and TRGBb2.

To be noted that, the last stage trained GAN 100_mT in FIG. 6 can be generated by executing steps S210-S240 in the training method 200.

In the embodiment of FIG. 6, in the steps for progressively training and growing the GAN 100 to form the last stage trained GAN 100_mT, the down sampling blocks 21-22 and the up sampling blocks 2528 are asymmetrically added to the decoder DECam and the encoder ENCam. Therefore, the spatial resolution of the converted image group IMGOUTm generated by the GAN 100_mT is different the spatial resolution of the input image group IMGINm. And, if the number of the up sampling blocks is more than the number of the down sampling blocks of the first generator 120, the spatial resolution of the converted image group IMGOUTm generated by the last stage trained GAN 100_mT is higher than the spatial resolution of the input image group IMGINm. Therefore, the GAN 100_m can translate the first style input image at the lower resolution to the second style output image (or the second style converted image) at the higher resolution.

Similarity, in the steps for progressively training and growing the GAN 100 to form the last stage trained GAN 100_mT, the down sampling blocks 41~44 and the up sampling blocks 4546 are asymmetrically added to the decoder DECbm and the encoder ENCbm. Therefore, the spatial resolution of the reconstructed image group IMGRECm generated by the GAN 100_mT is the same with the spatial resolution of the input image group IMGINm. Therefore, the cycle consistency loss function can be calculated based on the reconstructed image group IMGRECm and the input image group IMGINm with the same spatial resolution, and thus the GAN 100 can be trained and expanded to form the last stage trained GAN 100_mT.

In some embodiments, the real image group REALam and the converted image group IMGOUTm have the same spatial resolution, and thus the first discriminator Da can be trained. The real image group REALbm and the reconstructed image group IMGRECm ave the same spatial resolution, and thus the second discriminator Db can be trained.

Therefore, the last stage trained GAN 100_mT in FIG. 6 can generates the converted image group IMGOUTn with the high resolution (such as, 512*512 pixels) according to the input image group IMGIN2 with the low resolution (such as, 128*128 pixels).

Figure 7:
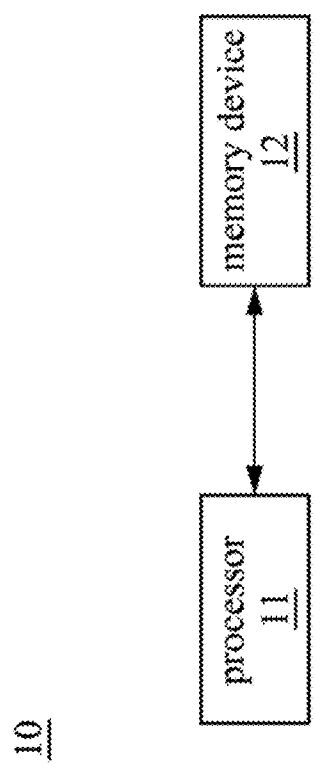
FIG. 7 is schematic diagram illustrating an electronic device according to some embodiments of this disclosure.

FIG. 7 is schematic diagram illustrating an electronic device 10 according to some embodiments of this disclosure. The electronic device 10 includes a processor 11 and a memory device 12. The processor 11 is electrically coupled to the memory device 12, and the processor 11 is configured to access instructions or data stored in the memory device 12. The memory device 12 can store the modules/architecture, parameters, data and instructions of the GAN 100 in every stage. The processor 11 is configured to access instructions or data stored in the memory device 12 to execute all the steps S210, S220, S230, S231~S236, S240 and S241~S245 included in the training method 200.

The processor 11 can be implemented by central processing unit, microprocessor, graphics processing unit, field-programmable gate array integrated circuit (FPGA), application-specific integrated circuit (ASIC) or other suitable hardware device for extracting or executing the instructions stored in the memory device 12.

The memory device 12 can be implemented by electrical, magnetic, optical memory devices or other storage devices for storing instructions or data. In some embodiments, the memory device 12 may be implemented by volatile memory or non-volatile memory. In some embodiments, the memory device 12 can be composed of random access memory (RAM), dynamic random access memory (DRAM), magnetoresistive random access memory (MRAM), Phase-Change Random Access Memory (PCRAM) or other storage devices.

Figure 8:
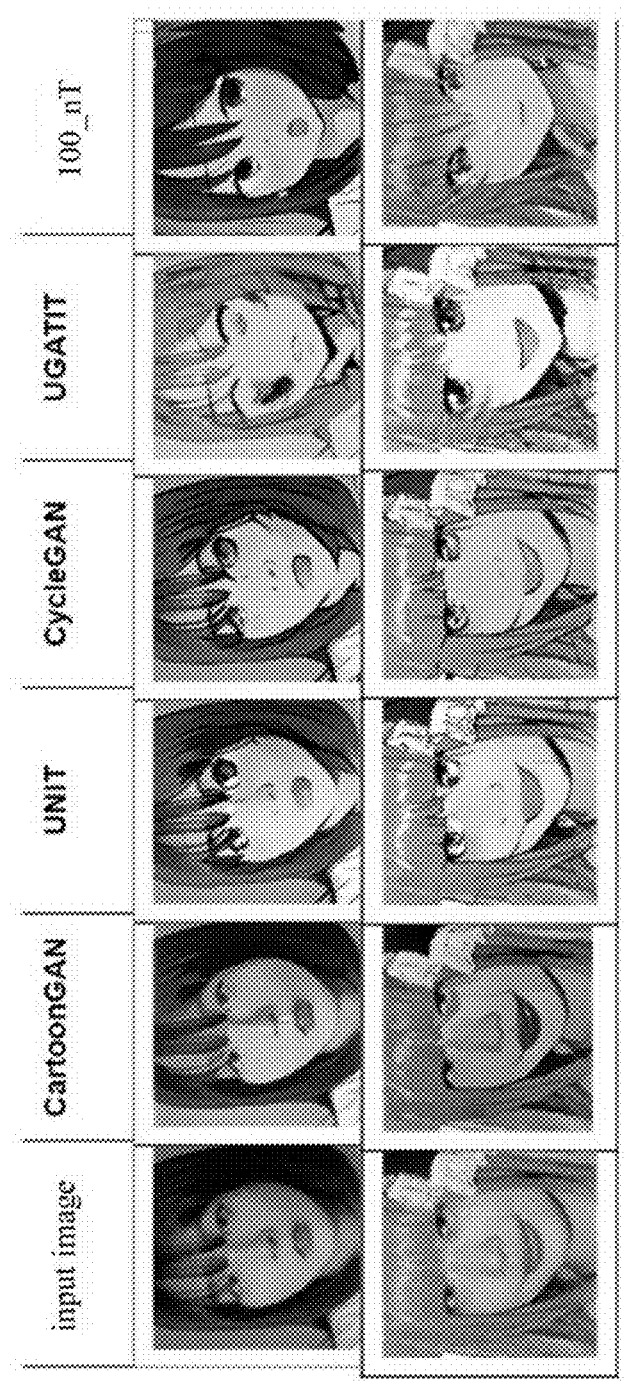
FIG. 8 is schematic diagram illustrating some output images converted by a last stage trained GAN according to some embodiments of this disclosure and the other output images converted by the other neural networks.
Figure 9:
FIG. 9 is schematic diagram illustrating some output images converted by a last stage trained GAN according to some embodiments of this disclosure and the other output images converted by the other neural networks.

FIGS. 8 and 9 are schematic diagrams illustrating some output images converted by a last stage trained GAN according to some embodiments of this disclosure and the other output images converted by the other neural networks. As shown in FIGS. 8 and 9, under the condition of the same input image, the image qualities of the converted images generated by the cartoon generative adversarial network CartoonGAN, unsupervised image-to-image neural translation network UNIT, cycle generative adversarial network CycleGAN and unsupervised generative attentional networks with adaptive layer-instance normalization for image-to-image translation UGATIT are lower than the image converted by the last stage trained GAN 100_nT of the present disclosure. The image converted by the last stage trained GAN 100_nT has the best quality and distinctive style.

Figure 10:
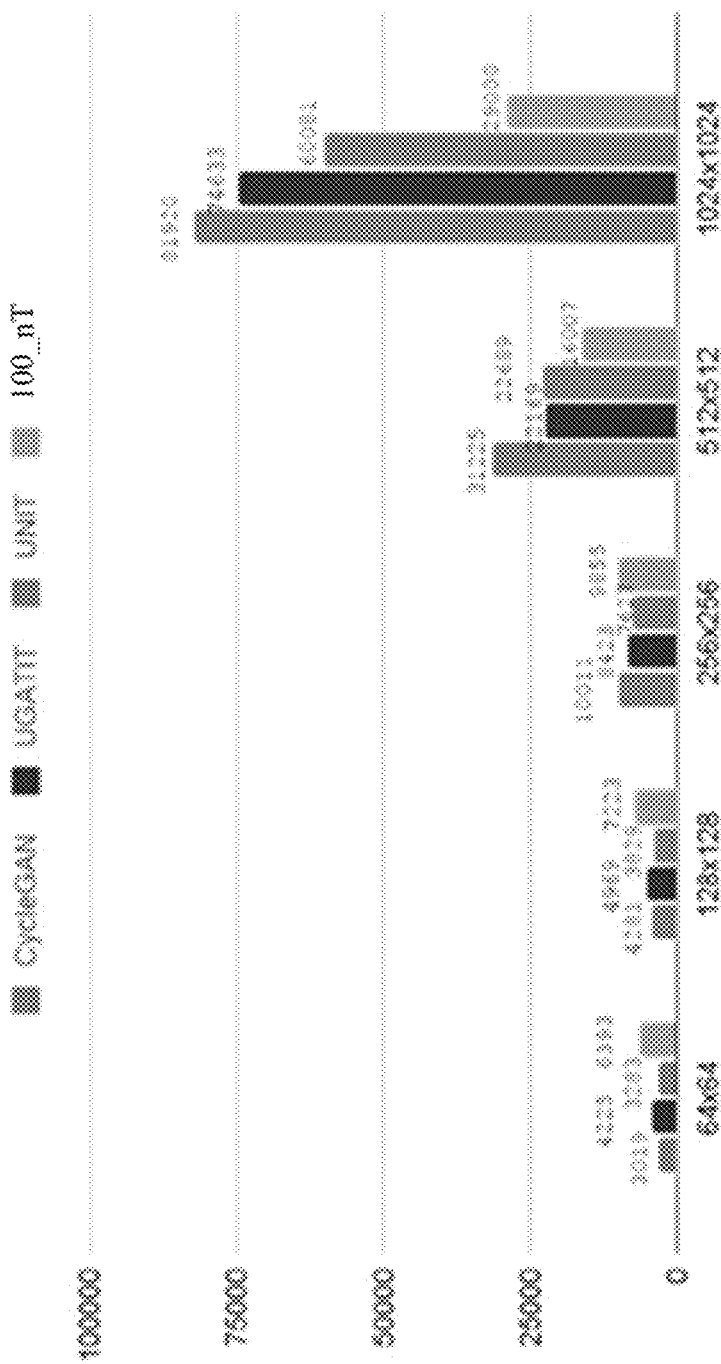
FIG. 10 is schematic diagram illustrating resources required for module training of the other neural networks and resources required for executing module training on a first stage GAN to a last stage trained GAN according to some embodiments of this disclosure.

Reference is made to FIG. 10. FIG. 10 is schematic diagram illustrating resources required for module training of the other neural networks and resources required for executing module training on a first stage GAN 100_1 to a last stage trained GAN 100_nT according to some embodiments of this disclosure. As shown in FIG. 10, there requires computing resources of 81920 MB, 74633 MB, 60081 MB for module training on the cycle generative adversarial network CycleGAN, unsupervised generative attentional networks with adaptive layer-instance normalization for image-to-image translation UGATIT and unsupervised image-to-image neural translation network UNIT. The computing resources (29000 MB) for module training on the last stage trained GAN 100_nT of the present disclosure is much less than other neural network architectures.

Figure 11:
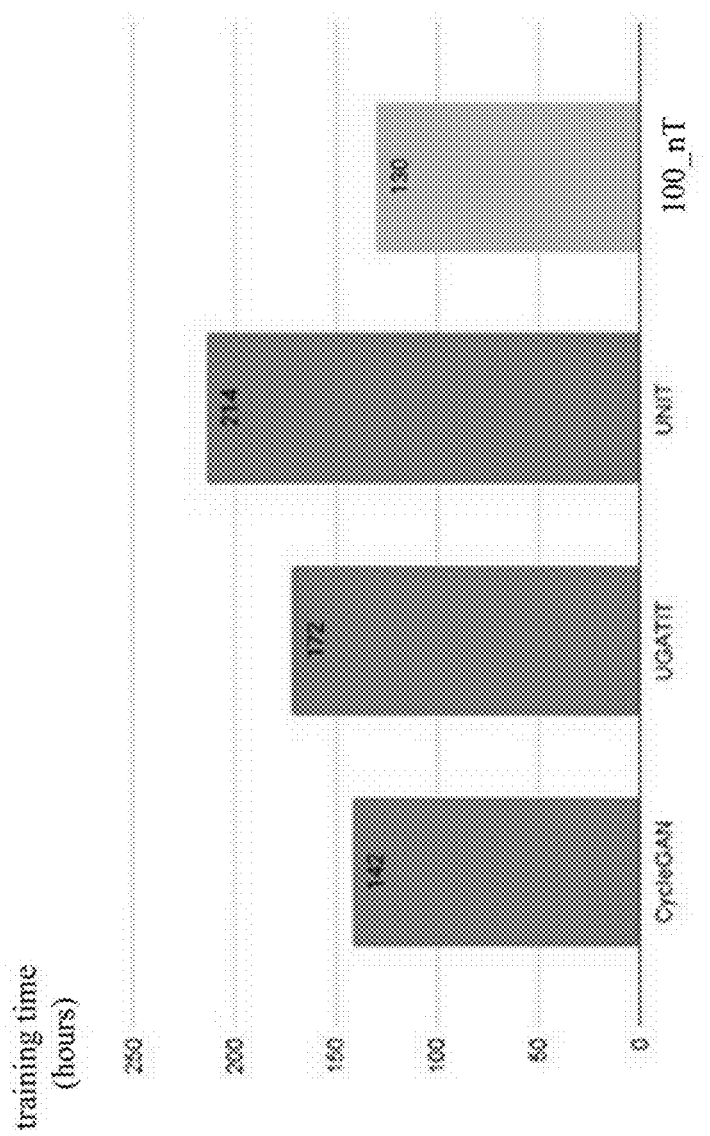
FIG. 11 is schematic diagram illustrating time lengths for module training of the other neural networks and a time length for executing module training on a first stage GAN to a last stage trained GAN according to some embodiments of this disclosure.

Reference is made to FIG. 11. FIG. 11 is schematic diagram illustrating time lengths for module training of the other neural networks and a time length for executing module training on a first stage GAN 100_1 to a last stage trained GAN 100_nT according to some embodiments of this disclosure. In some embodiments, the update for the parameters in the inner blocks/layer of the GAN 100 is in a relatively stable manner. Therefore, the amount of parameter required for completing the module training of the last stage trained GAN 100_nT of the present disclosure are much less than other neural networks, so as to train the GAN 100 in shorter time and the last stage trained GAN 100_nT can increase the accuracy of outcomes.

As shown in FIG. 11, the time required for performing module training on the cycle generative adversarial network CycleGAN, unsupervised generative attentional networks with adaptive layer-instance normalization for image-to-image translation UGATIT and unsupervised image-to-image translation network UNIT (such as, 140, 172 and 214 hours) are longer than the time required for performing module training on the GAN 100 from the first stage GAN 100_1 to the last stage trained GAN 100_nT (such as, 130 hours). The time required for performing module training on the GAN 100 is much less than other neural network. Therefore, the last stage trained GAN 100_nT generated by progressively growing and training can shortens the module training time and outputs high-quality converted images.

Figures 12A, 12B, 12C:
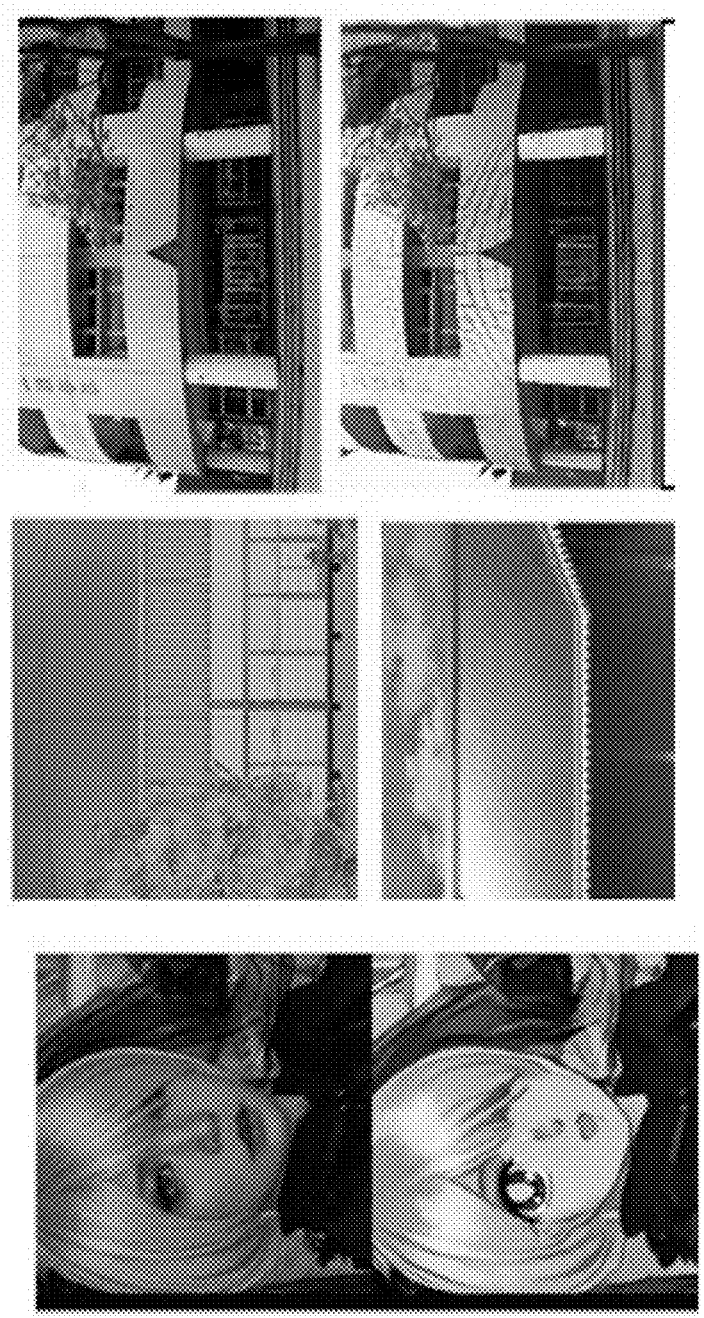
FIGS. 12A-12C are schematic diagram illustrating converted images with different styles according to some embodiments of this disclosure.

Reference is made to FIGS. 12A to 12C. FIGS. 12A-12C are schematic diagram illustrating converted images with different styles according to some embodiments of this disclosure. As shown in FIG. 12A, in some embodiments, the last stage trained GAN 100_nT can convert the real face image to the comic style image. As shown in FIG. 12B, in some embodiments, the last stage trained GAN 100_nT can convert a hand-drawn architectural image into a real architectural image. As shown in FIG. 12C, in some embodiments, the last stage trained GAN 100_nT can convert an actual building image to a specific style image.

Figure 13B:
FIG. 13B is schematic diagram illustrating an avatar converted from a real face image according to some embodiments of this disclosure.
Figure 13A:
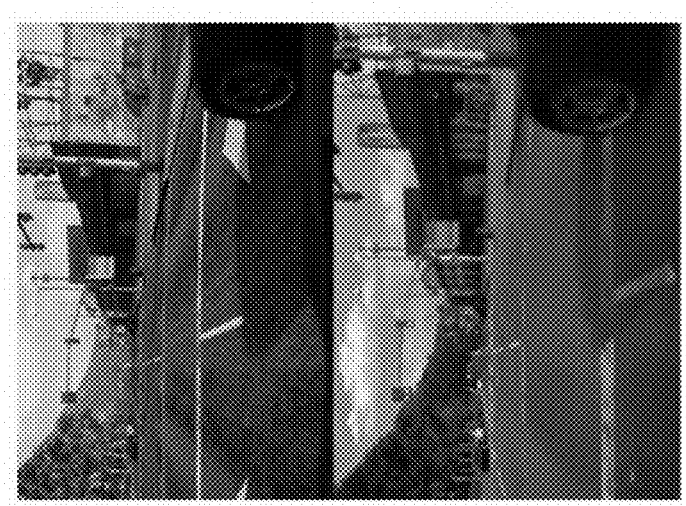
FIG. 13A is schematic diagram illustrating a real street image converted from a street view image in video games according to some embodiments of this disclosure.

Reference is made to FIG. 13A, FIG. 13A is schematic diagram illustrating a real street image converted from a street view image in video games according to some embodiments of this disclosure. In some embodiments, the training data used for the GAN 100 can be implemented by real street view images captured from the specific area (such as, city, town). And thus, the last stage trained GAN 100_nT can convert the street view image in video game to the real street view image in some embodiments.

Reference is made to FIG. 13B. FIG. 13B is schematic diagram illustrating an avatar converted from a real face image according to some embodiments of this disclosure. In some embodiments, the last stage trained GAN 100_nT is configured to convert the real face to avatar. Therefore, users can record video through the avatar.

Summary, the present disclosure provide a training method 200 for progressively training and growing the GAN 100 to generate the last stage trained GAN 100_nT, and the GAN 100 of the present disclosure includes the cycle consistence architecture, so as to avoid the mode collapse on the converted image, and to ensure the quality of the converted image, and by progressively adding and training the sampling blocks with the higher resolutions, the GAN 100 can extract the global features and local features in the input image groups, in order to generate the images with higher quality.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A training method, comprising:
   generating a plurality of input image groups according to a plurality of spatial resolution, wherein the input image groups comprises a first input image group to a last input image group according to the spatial resolution from low to high;
   constructing a first stage generative adversarial network (GAN), wherein the first stage GAN comprises a first generator and a second generator;
   training and growing the first stage GAN according to the first input image group to form a second stage GAN, wherein the step of training and growing the first stage GAN comprises:
      generating a converted image group, by the first generator, according to the first input image group;
      generating a reconstructed image group, by the second generator, according to the converted image group;
      calculating a cycle consistency loss function according to the reconstructed image group and the first input image group, and updating the first stage GAN based on the cycle consistency loss function to generate a first stage trained GAN; and
      adding at least one first sampling block to the first stage trained GAN to generate the second stage GAN; and
   progressively training and growing the second stage GAN in a plurality of stages according to a second input image group to the last input image group to generate a last stage trained GAN.

2. The training method as claimed in claim 1, wherein the step of progressively training and growing the second stage GAN in the stages to generate the last stage trained GAN comprises:
   training a current stage GAN according to one of the input image groups with a current stage spatial resolution to generate a current stage trained GAN;
   if the current stage spatial resolution does not reach a last resolution, adding at least one second sampling block to the current stage trained GAN to generate a nest stage GAN, and outputting the nest stage GAN to a next stage as the current stage GAN; and
   if the current stage spatial resolution is the last resolution, outputting the current stage trained GAN as the last stage trained GAN.

3. The training method as claimed in claim 2, wherein the step of progressively training and growing the second stage GAN in the stages to generate the last stage trained GAN comprises:

generating the at least one second sampling block according to a next spatial resolution of a next input image group.

4. The training method as claimed in claim 2, wherein the at least one second sampling block comprises at least one up sampling block and at least one down sampling block, wherein the step of progressively training and growing the second stage GAN in the stages to generate the last stage trained GAN comprises:
symmetrically adding the at least one up sampling block and the at least one down sampling block to two encoders and two decoders of two generators in the current stage trained GAN to form the nest stage GAN.

5. The training method as claimed in claim 4, wherein each of the at least one up sampling block comprises a convolutional layer, and wherein a linear superposition is between an input and an output of the convolutional layer to form a residual connection.

6. The training method as claimed in claim 2, wherein the at least one second sampling block comprises at least one up sampling block and at least one down sampling block, wherein the step of progressively training and growing the second stage GAN in the stages to generate the last stage trained GAN stages comprises:
asymmetrically adding the at least one up sampling block or the at least one down sampling block to a decoder of one of two generator and an encoder of the other one of the two generator to form the nest stage GAN.

7. The training method as claimed in claim 6, wherein a first resolution of a last converted image group generated by the last stage trained GAN according to the last input image group is different from a second resolution of the last input image group.

8. The training method as claimed in claim 7, wherein the first resolution of the last converted image group is higher than the second resolution of the last input image group.

9. The training method as claimed in claim 6, wherein each of the at least one up sampling block comprises a convolutional layer, and wherein a linear superposition is between an input and an output of the convolutional layer to form a residual connection.

10. The training method as claimed in claim 1, wherein the step of training and growing the first stage GAN comprises:
generating first determination results, by a first discriminator, according to the converted image group and a first real image group with the same style as the converted image group, and updating parameters of the first generator according to the first determination results; and
generating second determination results, by a second discriminator, according to the reconstructed image group and a second real image group with the same style as the reconstructed image group, and updating parameters of the second generator according to the second determination results.

11. An electronic device, comprising:
a memory device, configured to store instructions and data; and
a processor, electrically coupled to the memory device, configured to access the instructions and the data stored in the memory device to:
generate a plurality of input image groups according to a plurality of spatial resolution, wherein the input image groups comprises a first input image group to a last input image group according to the spatial resolution from low to high;
construct a first stage generative adversarial network (GAN), wherein the first stage GAN comprises a first generator and a second generator;
train and grow the first stage GAN according to the first input image group to form a second stage GAN, wherein during training and growing the first stage GAN, the processor is further configured to:
generate a converted image group, by the first generator, according to the first input image group;
generate a reconstructed image group, by the second generator, according to the converted image group;
calculate a cycle consistency loss function according to the reconstructed image group and the first input image group, and update the first stage GAN based on the cycle consistency loss function to generate a first stage trained GAN; and
add at least one first sampling block to the first stage trained GAN to generate the second stage GAN; and
progressively train and grow the second stage GAN in a plurality of stages according to a second input image group to the last input image group to generate a last stage trained GAN.

12. The electronic device as claimed in claim 11, wherein the processor is further configured to:
train a current stage GAN according to one of the input image groups with a current stage spatial resolution to generate a current stage trained GAN;
if the current stage spatial resolution does not reach a last resolution, add at least one second sampling block to the current stage trained GAN to generate a nest stage GAN, and output the nest stage GAN to a next stage as the current stage GAN; and
if the current stage spatial resolution is the last resolution, output the current stage trained GAN as the last stage trained GAN.

13. The electronic device as claimed in claim 12, wherein the processor is further configured to:
generate the at least one second sampling block according to a next spatial resolution of a next input image group.

14. The electronic device as claimed in claim 12, wherein the processor is further configured to:
symmetrically add the at least one up sampling block and the at least one down sampling block to two encoders and two decoders of two generators in the current stage trained GAN to form the nest stage GAN.

15. The electronic device as claimed in claim 14, wherein each of the at least one up sampling block comprises a convolutional layer, and wherein a linear superposition is between an input and an output of the convolutional layer to form a residual connection.

16. The electronic device as claimed in claim 12, wherein the at least one second sampling block comprises at least one up sampling block and at least one down sampling block, wherein the processor is further configured to:
asymmetrically add the at least one up sampling block or the at least one down sampling block to a decoder of one of two generator and an encoder of the other one of the two generator to form the nest stage GAN.

17. The electronic device as claimed in claim 16, wherein a first resolution of a last converted image group generated by the last stage trained GAN according to the last input image group is different from a second resolution of the last input image group.

18. The electronic device as claimed in claim 17, wherein the first resolution of the last converted image group is higher than the second resolution of the last input image group.

19. The electronic device as claimed in claim 16, wherein each of the at least one up sampling block comprises a convolutional layer, and wherein a linear superposition is between an input and an output of the convolutional layer to form a residual connection.

20. The electronic device as claimed in claim 11, wherein the processor is further configured to:
- generate first determination results, by a first discriminator, according to the converted image group and a first real image group with the same style as the converted image group, and update parameters of the first generator according to the first determination results; and
- generate second determination results, by a second discriminator, according to the reconstructed image group and a second real image group with the same style as the reconstructed image group, and update parameters of the second generator according to the second determination results.

\* \* \* \* \*